US 8,228,296 B2

(12) United States Patent
Lee (10) Patent No.: US 8,228,296 B2
(45) Date of Patent: Jul. 24, 2012

(54) PORTABLE INFORMATION PROCESSSING APPARATUS

(75) Inventor: Dong-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 11/739,810

(22) Filed: Apr. 25, 2007

(65) Prior Publication Data

US 2008/0174558 A1    Jul. 24, 2008

(30) Foreign Application Priority Data

Jan. 24, 2007    (KR) .................. 10-2007-0007659

(51) Int. Cl.
*G06F 3/02*    (2006.01)
(52) U.S. Cl. ................ 345/168; 345/169; 345/170
(58) Field of Classification Search .......... 345/156–178; 178/18.01–18.09
See application file for complete search history.

(56) References Cited

U.S. PATENT DOCUMENTS

| | | | |
|---|---|---|---|
| 5,329,278 A | 7/1994 | Dombroski | |
| 5,360,955 A | 11/1994 | English et al. | |
| 5,673,040 A | 9/1997 | Hargreaves et al. | |
| 5,703,626 A * | 12/1997 | Itoh et al. | 345/173 |
| 6,278,442 B1 * | 8/2001 | Griffin et al. | 345/169 |
| 6,580,932 B1 * | 6/2003 | Finke-Anlauff | 455/566 |
| 7,087,850 B1 | 8/2006 | Murzanski | |
| 7,129,433 B2 | 10/2006 | Tokusashi | |
| 7,224,345 B2 * | 5/2007 | Kawell et al. | 345/169 |
| 2005/0156903 A1 * | 7/2005 | Kawell et al. | 345/173 |

OTHER PUBLICATIONS

United States Advisory Action issued Dec. 9, 2010 in U.S. Appl. No. 11/938,925.
Chinese Office Action issued Aug. 15, 2011 in CN Application No. 200810092339.3.
United States Office Action issued Oct. 31, 2011 in U.S. Appl. No. 11/938,925.
United States Office Action issued Sep. 21, 2010 in U.S. Appl. No. 11/938,925.
United States Office Action issued Jun. 11, 2010 in U.S. Appl. No. 11/938,925.

* cited by examiner

*Primary Examiner* — Vijay Shankar
(74) *Attorney, Agent, or Firm* — Stanzione & Kim, LLP (57) ABSTRACT

A portable information processing apparatus including a main body which includes a display opening and a front panel surface surrounding the display opening, a display to display an image through the display opening, and a key button input unit including one or more horizontal key groups including a plurality of key buttons arranged in an outwardly direction from the display opening in a portion of the front panel surface; and a reference line to connect and extend across top end portions of referenced key buttons in the one or more horizontal key groups extending in the outwardly direction from the display opening, wherein at least a portion of the reference line forms an angle with respect to a plane including a viewing surface of the display unit.

31 Claims, 8 Drawing Sheets

PORTABLE INFORMATION PROCESSSING APPARATUS

CROSS-REFERENCE TO RELATED APPLICATIONS

This application claims priority under 35 U.S.C. §119(a) from Korean Patent Application No. 2007-007659, filed on Jan. 24, 2007, in the Korean Intellectual Property Office, the disclosure of which is incorporated herein in its entirety by reference.

BACKGROUND OF THE INVENTION

1. Field of the Invention

The present general inventive concept relates to a portable information processing apparatus, and more particularly, to a portable information processing apparatus having an improved structure of an input unit and an output unit on a front panel.

2. Description of the Related Art

In general, a portable information processing apparatus is used in processing various information and provides convenience to a user in his/her daily life. As an example of the portable information processing apparatus, there are an MP3 player, a personal digital assistant (PDA), a cellular phone, an electronic frame and a portable multimedia player (PMP), etc. Hereinafter, an ultra mobile personal computer (UMPC) will be described as a small, portable and multifunctional computer, i.e., the portable information processing apparatus.

The UMPC is a data processor, and has functions of a notebook, a tablet personal computer, a navigator, a portable storage, a portable multimedia player (PMP), a personal digital assistant (PDA), a digital multimedia broadcasting (DMB) player, etc. Such an UMPC is lightweight, small-sized and portable, so that it is convenient for a user to transport. The UMPC allows a user to input and output information or the like in various environments.

Therefore, if an input unit is efficiently arranged in the UMPC, it will be convenient for a user to input and output information, data, etc.

SUMMARY OF THE INVENTION

The present general inventive concept provides a portable information processing apparatus that reduces errors corresponding to a user's manipulation of the portable information processing apparatus and improves the convenience of using the portable information processing apparatus.

The present general inventive concept is to provide a portable information processing apparatus in which a path of a user's manipulation of an input unit is minimized.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a portable information processing apparatus including a main body which includes a display opening and a front panel surface surrounding the display opening, a display unit to display an image through the display opening, a key button input unit which includes one or more horizontal key groups including a plurality of key buttons arranged in an outwardly direction from the display opening in a portion of the front panel surface, and a reference line to connect and extend across top end portions of referenced key buttons in the one or more horizontal key groups; wherein at least a portion of the referenced line forms an angle with respect to a plane including a viewing surface of the display unit.

The key button input unit may also include at least one of a first key group and a second key group disposed in opposite sides of the front panel surface across the display opening.

The one or more horizontal key groups may also comprise a plurality of horizontal key groups sequentially arranged in a direction along an edge side of the display opening.

Distances between the top end portions of the referenced key buttons in the one or more horizontal key groups and the plane of the display unit gradually increase proceeding along an outwardly direction from the display opening.

Distances between the top end portions of the referenced key buttons in the one or more horizontal key groups and the plane of the display unit gradually decrease proceeding along an outwardly direction from the display opening.

Distances between the top end portions of the referenced key buttons in the one or more horizontal key groups and the plane of the display unit gradually increase and then gradually decrease proceeding along an outwardly direction from the display opening.

The reference line may have a predetermined curvature.

The at lease a portion of the reference line forms an angle with respect to the plane of the display unit in a direction along the edge side of the display opening.

The foregoing and/or other aspects and utilities of the present general inventive concept may also be achieved by providing a portable information process apparatus including a main body which includes a display opening and a front panel surface surrounding the display opening, a display unit to display an image through the display opening, and a key button input unit which includes a plurality of horizontal key groups including a plurality of key buttons arranged in an outwardly direction from the display opening in a portion of the front panel surface, the plurality of horizontal key groups being arranged in a direction along an edge side of the display opening, a reference line which connects and extends across top end portions of the one or more of the plurality of horizontal key groups arranged along the edge side of the display opening wherein at least a portion of the reference line forms an angle with respect to a plane including a viewing surface of the display unit.

The key button input unit may also include at least one of a first key group and a second key group disposed in opposite sides of the front panel surface across the display opening.

Distances between the top end portions of the referenced key buttons in the one or more horizontal key groups and the plane of the display unit gradually increase proceeding along an outwardly direction from the display opening.

Distances between the top end portions of the referenced key buttons in the one or more horizontal key groups and the plane of the display unit gradually decrease proceeding along an outwardly direction from the display opening.

Distances between the top end portions of the referenced key buttons in the one or more horizontal key groups and the plane of the display unit gradually decrease and then gradually increase proceeding along an outwardly direction from the display opening.

The reference line may have a predetermined curvature.

Distances between the top end portions of the referenced key buttons in the one or more horizontal key groups and the plane of the display unit gradually increase and then gradually decrease proceeding along an outwardly direction from the display opening.

The reference line may have a predetermined curvature.

The at least a portion of the reference line forms an angle with the plane of the display unit along the edge side of the display opening.

The foregoing and/or other aspects and utilities of the present general inventive concept can also be achieved by providing a portable information processing apparatus, comprising a front panel surface including a left panel surface, a right panel surface, an upper portion and a lower portion, and a display unit having a viewing surface to display an image, the display unit disposed proximate to the front panel surface, wherein each of the left panel surface having a first set of key buttons and the right panel surface having a second set of key buttons form an angle with respect to a plane including the viewing surface of the display unit.

The foregoing and/or other aspects and utilities of the present general inventive concept can also be achieved by providing a portable information processing apparatus, comprising a front panel surface including a left panel surface, a right panel surface, an upper portion and a lower portion, a display unit having a viewing surface to display an image, the display unit disposed proximate to the front panel surface, and a set of key buttons disposed in the front panel surface, each of the set of key buttons having top end portions and are arranged in at least a first direction, wherein a distance between two or more of the top end portions of each of the set of key buttons arranged in at least the first direction and a plane including the viewing surface of the display unit are not equal to each other.

The foregoing and/or other aspects and utilities of the present general inventive concept can also be achieved by providing a portable information processing apparatus, comprising a front panel surface including a left panel surface, a right panel surface, an upper portion and a lower portion, a display unit having a viewing surface to display an image, the display unit disposed proximate to the front panel surface, a first set of key buttons disposed in the left panel surface, each of the first set of key buttons having top end portions and are arranged in at least a first direction, and a second set of key buttons disposed in the right panel surface, each of the second set of key buttons having top end portions and are arranged in at least a second direction, wherein a distance between two or more of the top end portions of each of the first set of key buttons arranged in at least the first direction and a plane including the viewing surface of the display unit are not equal to each other.

The foregoing and/or other aspects and utilities of the present general inventive concept can also be achieved by providing a portable information processing apparatus, comprising a front panel surface including a left panel surface, a right panel surface, an upper portion and a lower portion, a display unit having a viewing surface to display an image, the display unit disposed proximate to the front panel surface, and a set of key groups including a plurality of keys disposed at each of left and right sides of the display unit, top portions of each set of the keys being arranged to form a sloping surface with respect to the viewing surface of the display unit.

BRIEF DESCRIPTION OF THE DRAWINGS

These and/or other aspects and utilities of the present general inventive concept will become apparent and more readily appreciated from the following description of the embodiments, taken in conjunction with the accompany drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
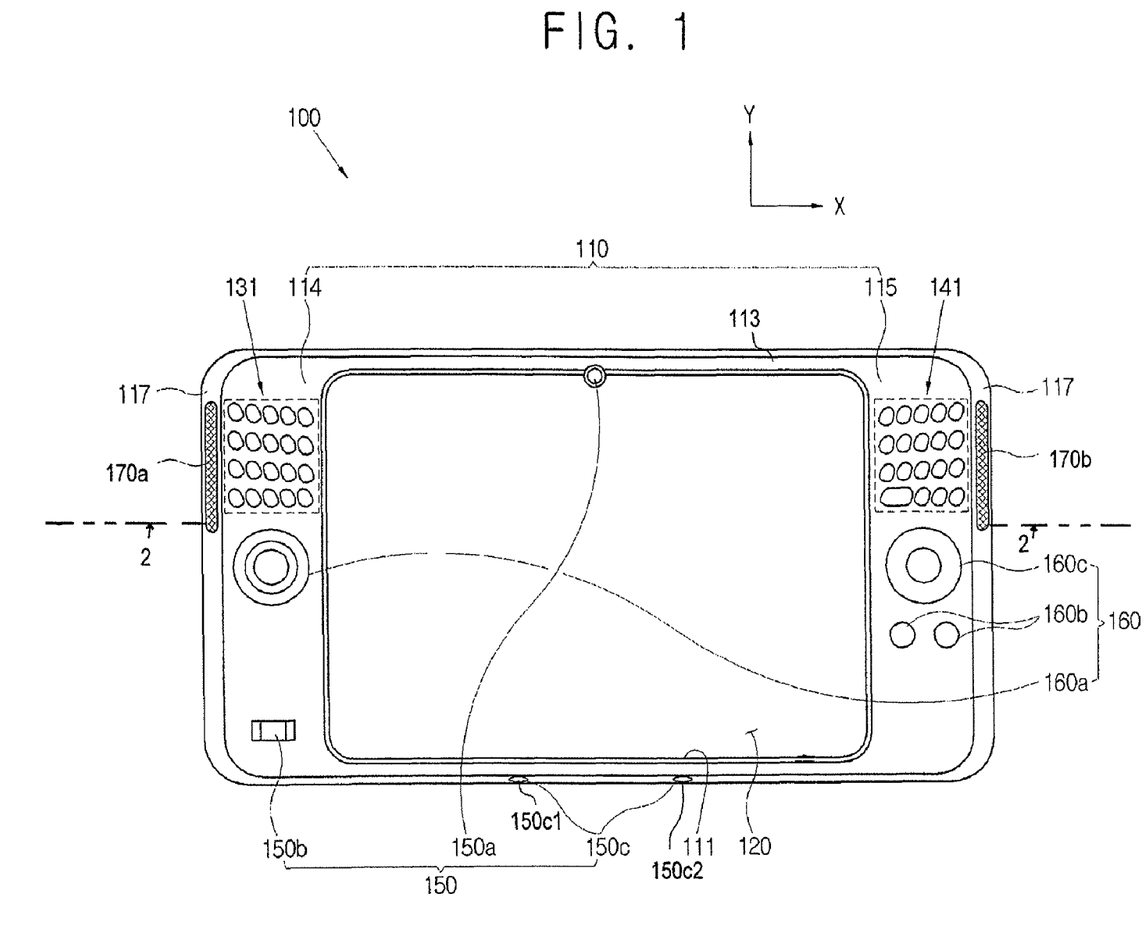
FIG. 1 is a front view illustrating a portable computer according to an exemplary embodiment of the present general inventive concept.
Figure 3:
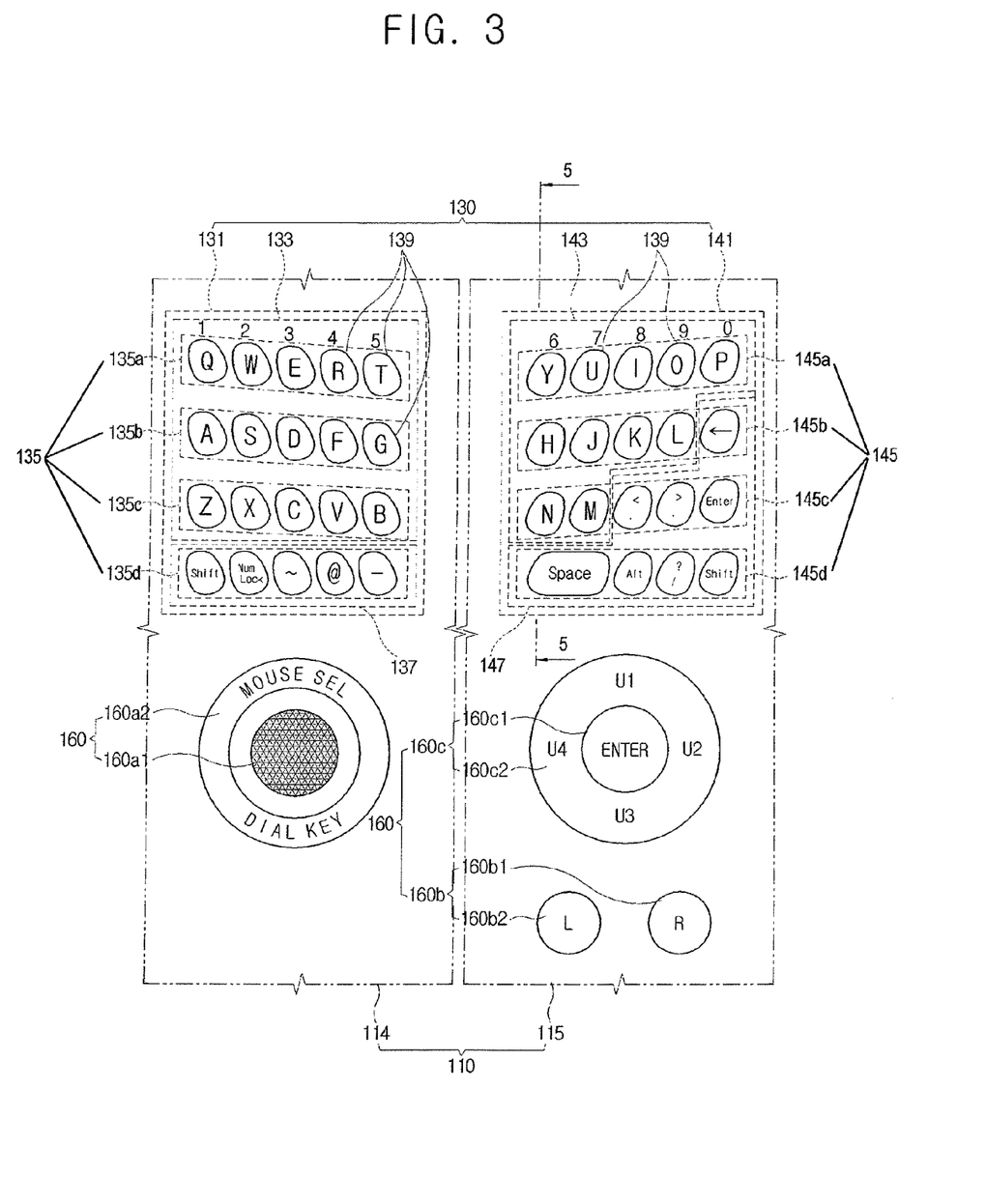
FIG. 3 is a partial layout of a left panel and a right panel of FIG. 1.
Figure 5A:
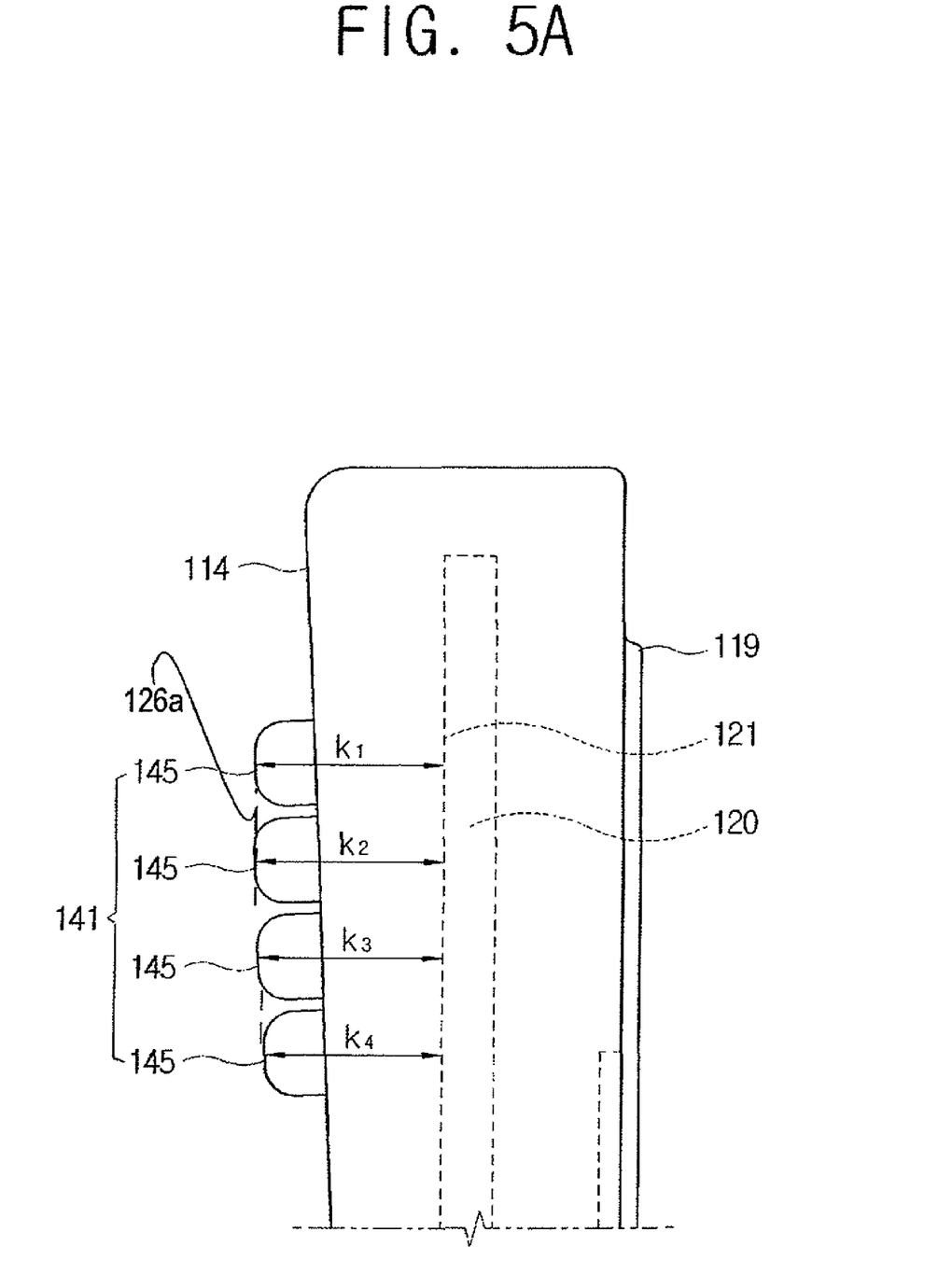
FIGS. 5A and 5B are sectional views of FIG. 3, taken along line 5-5.
Figure 5B:
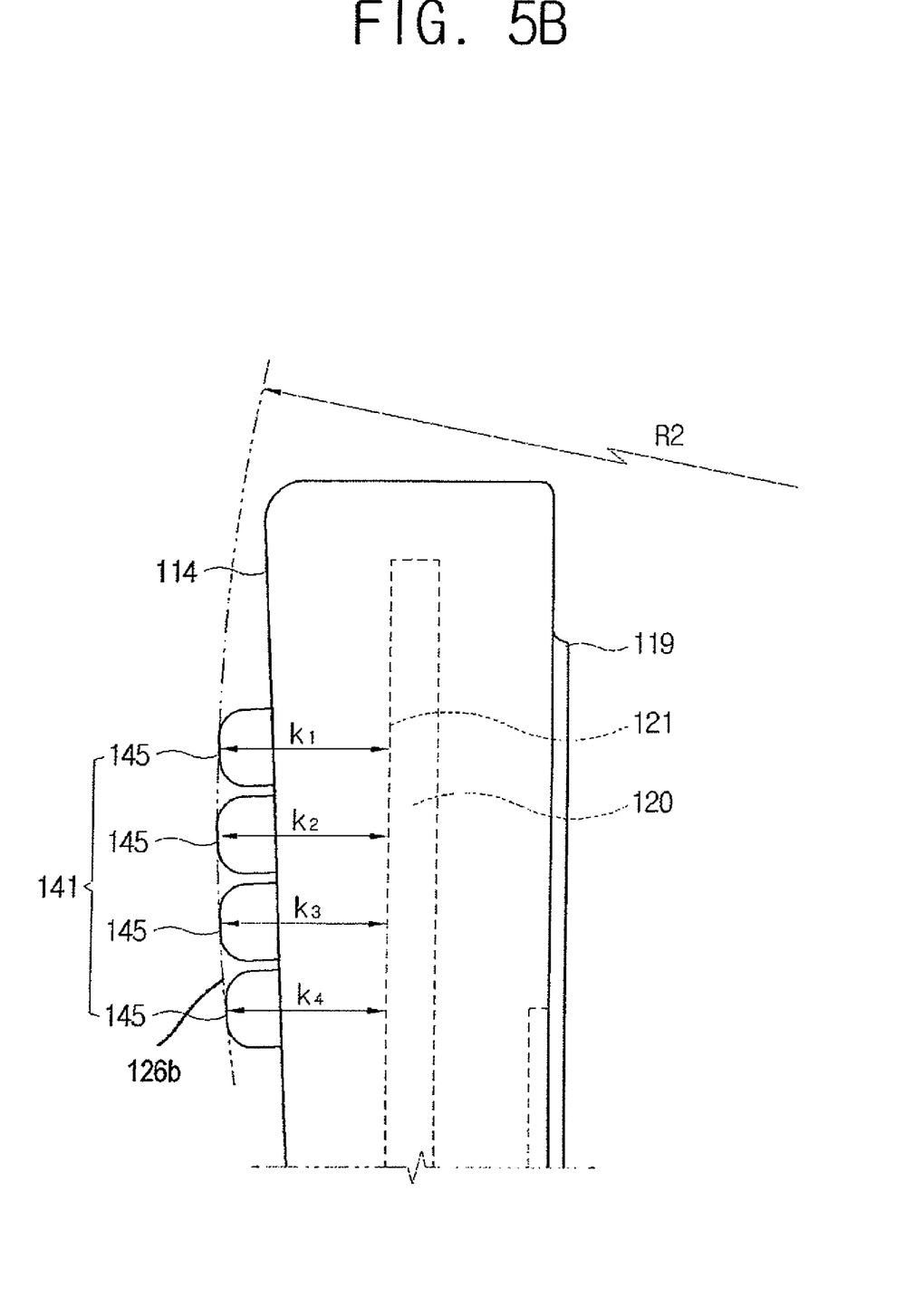
Figure 6:
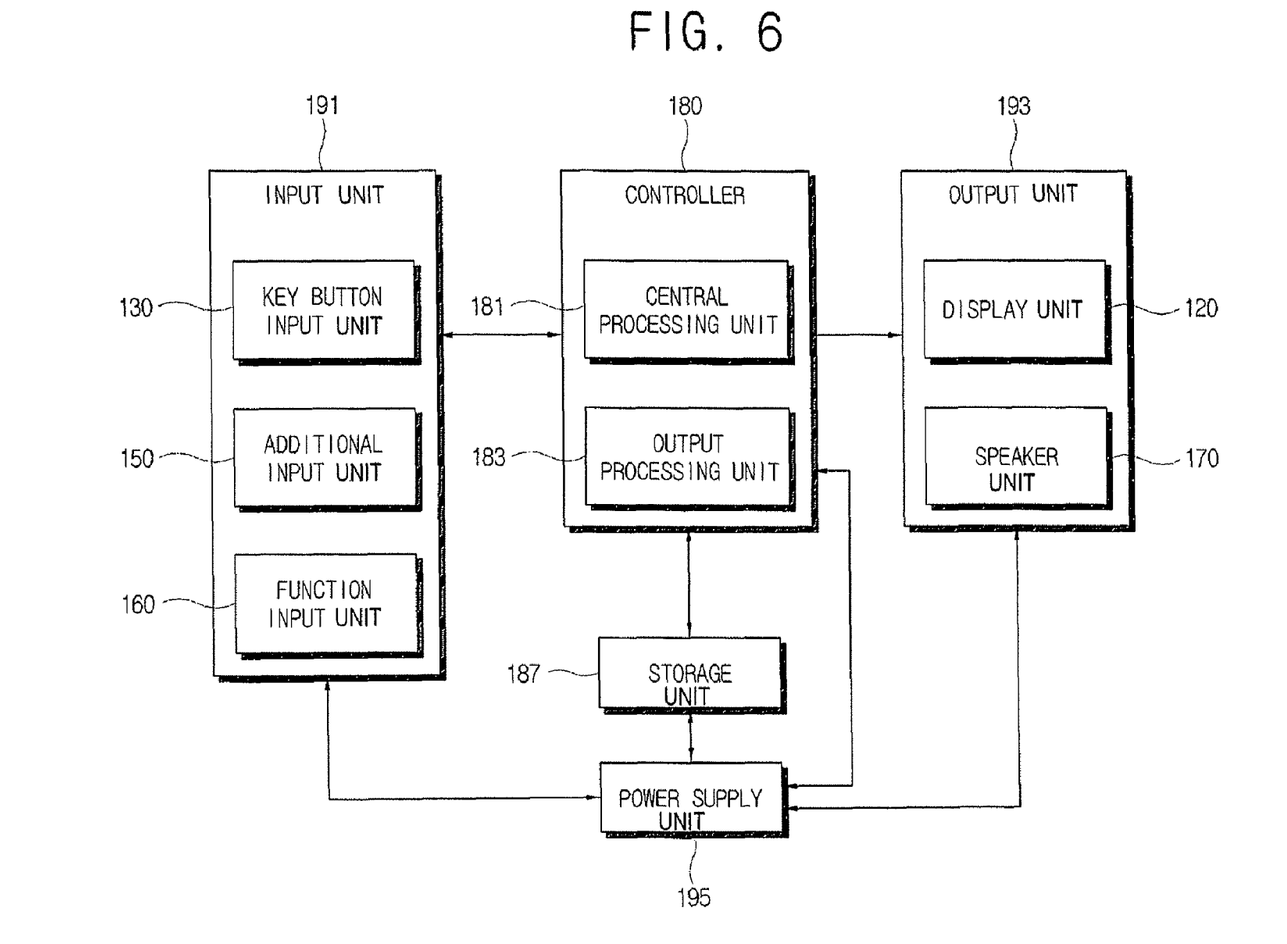
FIG. 6 is a control block diagram illustrating the portable computer of FIG. 1, according to an exemplary embodiment of the present general inventive concept.

Referring to FIG. 1, a portable computer 100 includes a main body 110, a display unit 120, and a key button input unit 130 (FIGS. 3 and 5). Further, the portable computer 100 includes an additional input unit 150 and a function input unit 160. Also, the portable computer 100 includes a controller 180 (FIG. 6). In addition, the portable computer 100 may be connected to an external keyboard (not illustrated) or the like as necessary.

As illustrated in FIG. 1, the main body 110 forms an overall outer appearance of the portable computer 100, and has a display opening 111 in the middle thereof, through which an image of the display unit 120 is exposed. Further, the main body 110 includes a front panel surface 113 in the front thereof. The main body 110 may also include a supporting bracket 119 (FIGS. 2 and 4A-5B) protruding from a back surface thereof and allowing the main body 110 to be supported, for example, when used on an installation surface such as a desk. Thus, the supporting bracket 119 allows a user to easily hold the portable computer 100 in both hands.

The main body 110 may also include a supporting stand (not illustrated) that rotates with respect to the main body 110, supports the main body 110 at an inclined angle to the installation surface, and is disposed in the back surface of the main body 110.

The front panel surface 113 is provided in the front of the main body 110 and forms a frontal appearance of the portable computer 100. Further, the front panel surface 113 is provided with an input unit 191 and an output unit 193 (FIG. 6) thereon. The input unit 191 may include various input units such as a key button input unit 130, an additional input unit 150 and a function input unit 160 (FIG. 6). The output unit 193 may include various output units such as a display unit 120 and a speaker unit 170 (FIG. 6).

Referring to FIG. 1, a right panel surface 115 is disposed at a right side of the display opening 111 of the front panel surface 113, and provided with a right key group 141 and a portion of the function input unit 160.

A left panel surface 114 is disposed at a left side of the display opening 111 of the front panel surface 113, and provided with a left key group 131, a portion of the function input unit 160, and an information recognizer 150b.

Figure 2:
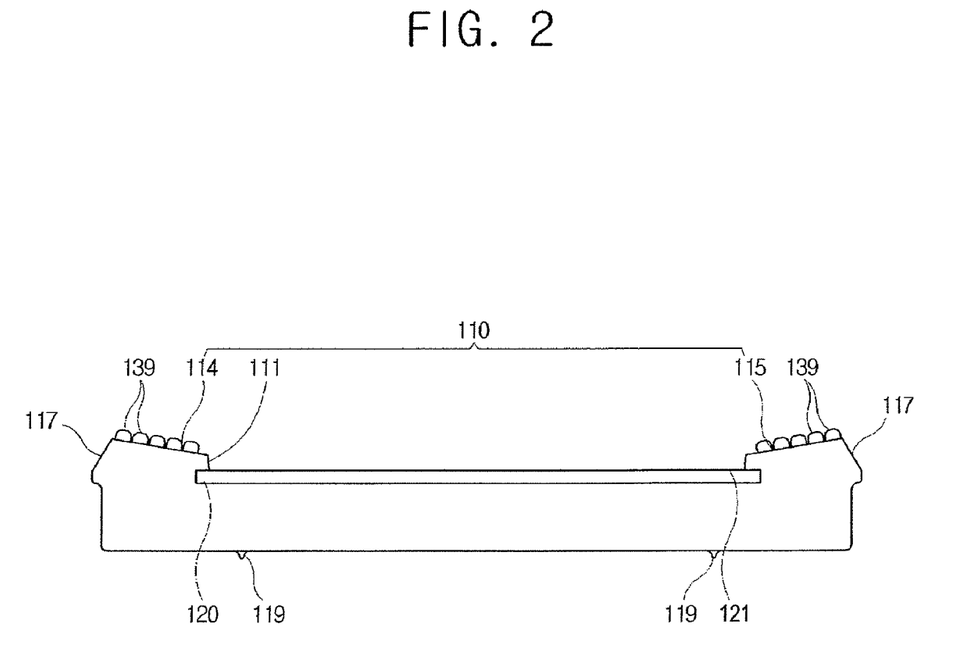
FIG. 2 is a sectional view of FIG. 1, taken along line 2-2.

As illustrated in FIG. 2, the left panel surface 114 and the right panel surface 115 may be provided at an inclined angle to a base plane 121, for example, a plane including a viewing surface, of the display unit 120. For example, an angle between each panel surface and the base plane 121 may gradually increase or decrease as the left panel surface 114 and the right panel surface 115 proceeds in an outwardly direction from the display opening 111. In an embodiment of the present general inventive concept, the left panel surface 114 and the right panel surface 115 may be concave or convex with a predetermined radius of curvature. Thus, the appearance of the front panel surface 113 is enhanced and key buttons 139 are efficiently arranged in the portable computer 100.

Referring to FIG. 1, a rounded surface 117 can be curved and extends backward from right and left ends of the portable computer 100. A speaker unit 170 may include a pair of speakers 170*a* and 170*b* respectively disposed in the rounded surface 117 in the left side and the right side of the portable computer 100. Thus, the speaker unit 170 provided in the rounded surface 117 effectively provides a user with sound. Further, this speaker arrangement enhances space efficiency of the front panel surface 113.

Referring to FIGS. 1 and 2, the display unit 120 displays an image through the display opening 111. Information input through the input unit 191 (FIG. 6) and data are processed by operation, determination, etc. of a central processing unit 181 (FIG. 6), and then converted into a predetermined signal, so that the display unit 120 displays an image based on the converted signal. The display unit 120 may have a touch screen function that enables a user to input information with a pen or the like. The display unit 120 is generally disposed in the center of the front panel surface 113 and can be any one of a variety of sizes. In this embodiment of the present general inventive concept, the display unit 120, having a diagonal length of "7" inches, will be described by way of example. The display unit 120 forms a base plane 121. The base plane 121, illustrated by the horizontal and vertical axes in FIG. 1, can be a plane including a viewing surface of the display unit 120.

Referring to FIGS. 3 and 6, the key button input unit 130 includes the left key group 131 and the right key group 141 which are disposed in opposite sides of the front panel surface 113 (FIG. 1) across the display opening 111 (FIGS. 1 and 2), respectively. The key button input unit 130 is included in the input unit 191, and allows a user to input letters, characters, etc. Further, the key button input unit 130 may have various functions as necessary. Thus, a user can conveniently input information such as text or the like while holding the main body 110 in his/her hands.

The left key group 131 is disposed in the left panel surface 114, and includes left letter input keys 133 and left character input keys 137.

The right key group 141 is disposed in the right panel surface 115, and includes right letter input keys 143 and right character input keys 147.

Referring to FIG. 3, the letter input keys 133 and 143 are disposed in the left and right key groups 131 and 141, respectively. Further, the letter input keys 133 and 143 include a plurality of horizontal key groups 135 and 145 including key buttons 139 arranged in an outwardly direction from the display opening 111. In an embodiment of the present general inventive concept, the left letter input keys 133 and the right letter input keys 143 include at least one of the horizontal key groups 135 and 145, respectively. For example, the left letter input keys 133 may include one or more of the respective horizontal key groups 135 and the right letter input keys 143 may include one or more of the other respective horizontal key groups 145. For example, the letter input keys 133 and 143 may be based on a keyboard for Hangeul with consonant and vowel sound keys and English with alphabet keys. Accordingly, the letter input keys 133 and 143 may be localized so that they can vary according to languages. In an embodiment of the present general inventive concept, the letter input keys 133 and 143 are positioned in upper portions of the right and left panel surfaces 114 and 115 so that a user can relatively freely move his/her thumbs and have an efficient path of manipulation while gripping the main body 110.

In an exemplary embodiment of the present general inventive concept, the letter input keys 133 and 143 are based on a "2-Bul" Korean input method and a "QWERTY" English input method. Alternatively, the letter input keys 133 and 143 may be based on a "3-Bul" Korean input method and a "QWERTY" English input method, or some other input method.

The horizontal key groups 135 and 145 are disposed on the same row of the left and right letter input keys 133 and 143. The horizontal key groups 135 and 145 include a plurality of key buttons 139. According to an exemplary embodiment of the present general inventive concept, each of the horizontal key groups 135 and 145 includes five key buttons 139. Alternative embodiments of the present general inventive concept, however, may include horizontal key groups 135 and 145 including more or less than five key buttons 139.

In an exemplary embodiment of the present general inventive concept, each of the respective horizontal key groups 135 and 145 may be disposed in a direction from an upper portion to a lower portion of the front panel surface 113 of the portable computer 100, for example, along an edge side of the display opening 111. Referring to FIG. 3, the horizontal key groups 135, on the left side of the portable computer 100, are arranged in four rows of horizontal key groups 135*a*, 135*b*, 135*c* and 135*d*, and the horizontal key groups 145, on the right side of the portable computer 100, are arranged in four rows of horizontal key groups 145*a*, 145*b*, 145*c* and 145*d*. Alternative embodiments, however, may include horizontal key groups 135 and 145 arranged in more or less than four rows.

Below, the horizontal key groups 135 and 145 can be arranged so that two or more of the respective key buttons 139 have varying distances from each other, measured from the top end portion of the respective key button 139 to the base plane 121, in an outwardly direction from the display opening 111 and will be described with reference to FIGS. 4A and 4B. Additionally, the horizontal key groups 135 and 145 can be arranged so that two or more of the horizontal key groups 135 and 145 have varying distances from each other, measured from the top end portions of the respective horizontal key group 135 and 145 to the base plane 121, along an edge side of the display opening 111, for example, in a direction from an upper portion to a lower portion of the front panel surface 113, will be described with reference to FIGS. 5A and 5B.

The portable computer 100 according to an exemplary embodiment of the present general inventive concept may employ both, or either, arrangement of the horizontal key groups 135 and 145 described and illustrated according to FIGS. 4A and 4B and 5A and 5B.

Figure 4A:
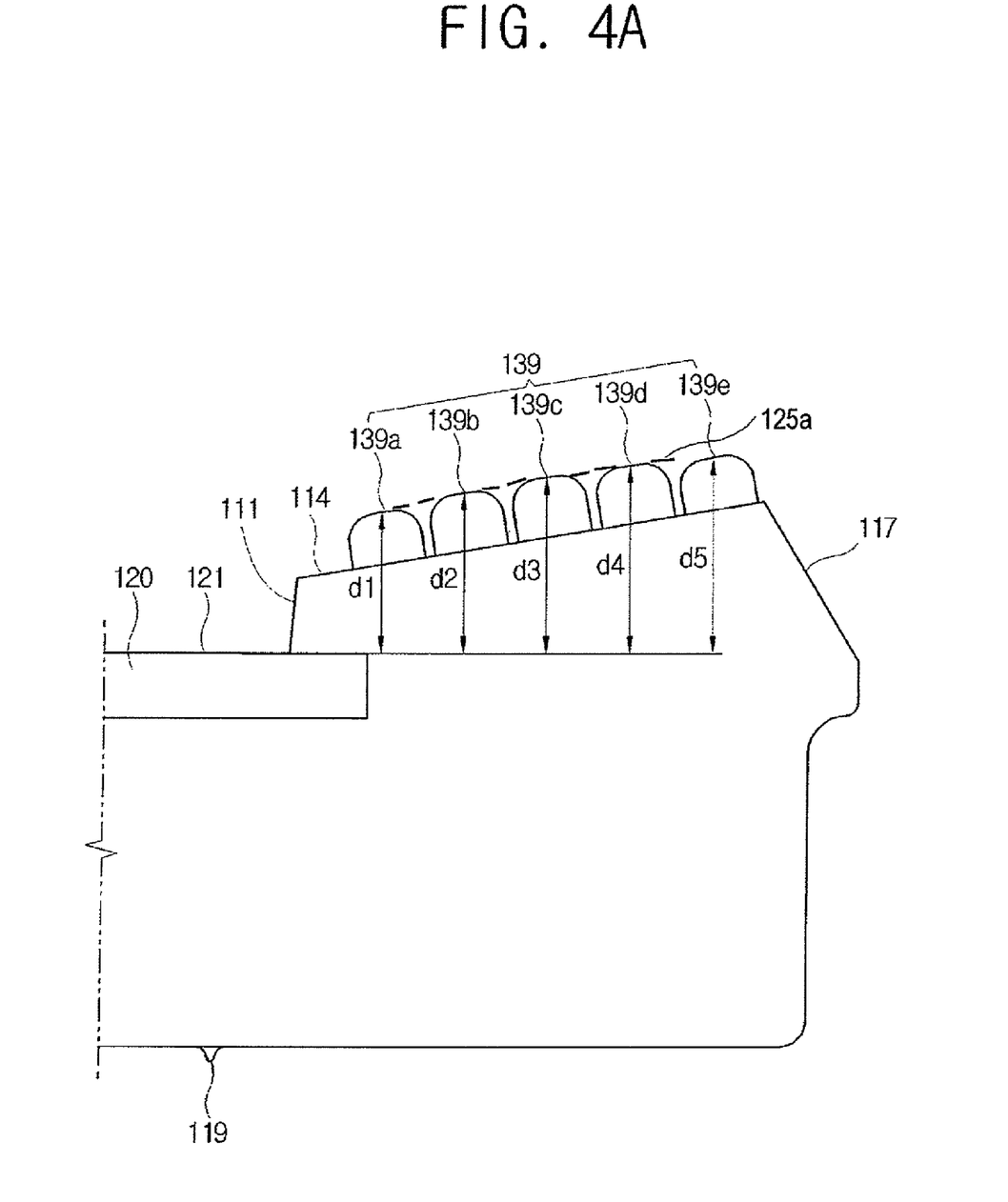
FIGS. 4A and 4B are partial sectional views of FIG. 1 to illustrate distances between top end portions of a horizontal key group and a base plane.
Figure 4B:
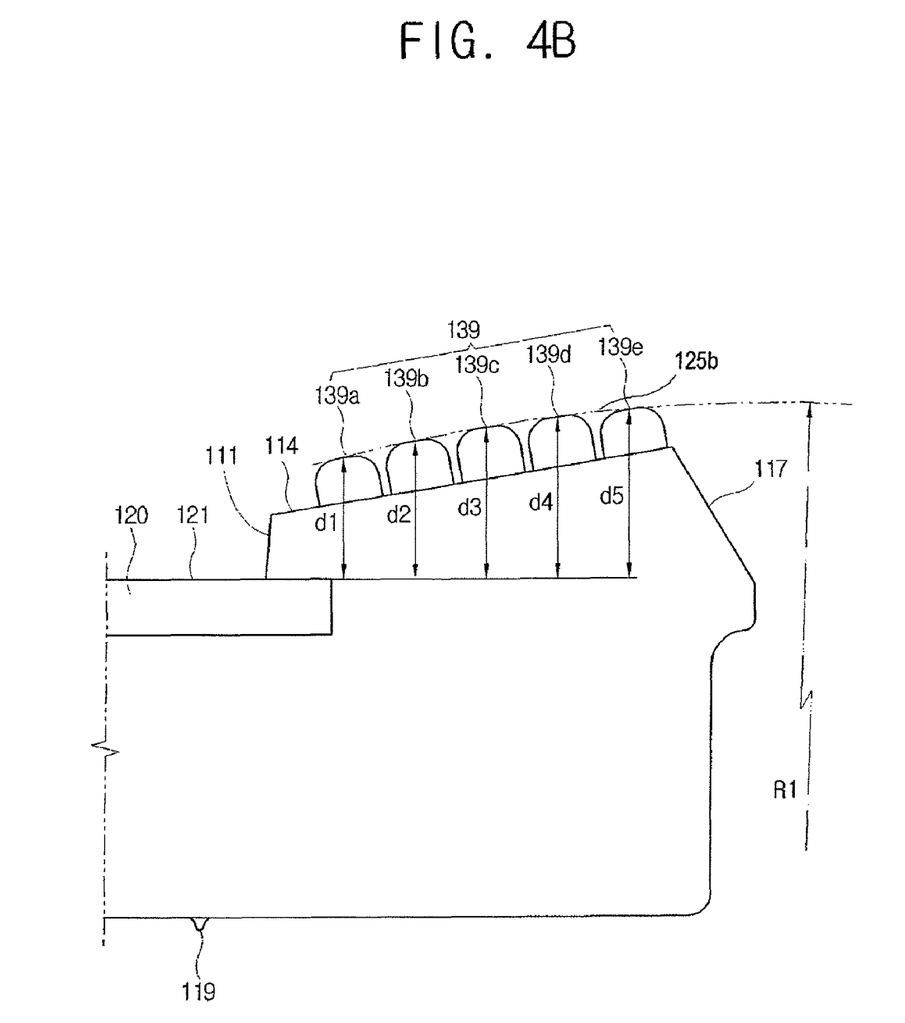

Referring to FIGS. 4A and 4B, at least a portion of a reference line 125*a* and 125*b* connecting and extending across top end portions of respective key buttons 139*a*, 139*b*, 139*c*, 139*d* and 139*e* in each of the respective horizontal key groups 135*a*, 135*b*, 135*c* and 135*d* in an outwardly direction from the display opening 111, is angled with respect to the base plane 121 of the display unit 120. Hereinafter, a reference numeral of "139" is collectively given to the key buttons, but individual key buttons may have reference numerals of 139*a* to 139*e* as necessary.

Referring to FIG. 4A, distances between the top end portions of the respective key buttons 139*a* to 139*e* arranged in an outwardly direction, for example, of a respective horizontal key group 135a from the display opening 111 and the base plane 121 are d1, d2, d3, d4 and d5, respectively.

Referring to FIG. 4A, the distances between the top end portions of the respective key buttons 139a to 139e of the respective horizontal key group 135a and the base plane 121 of the display unit 120 may gradually increase proceeding along an outwardly direction from the display opening 111. That is, d1<d2<d3<d4<d5. In this embodiment, for example, the reference line 125a connecting and extending across the top end portions of the respective key buttons 139a to 139e in the respective horizontal key group 135a may be a straight line 125a. In an alternative embodiment, however, the reference line 125a may be a curved line 125b (FIG. 4B). Further, at least a portion of the reference 125a line may be parallel to the base plane 121. For example, d1<d2=d3<d4<d5.

In another embodiment of the present general inventive concept, for example, the distances between the top end portions of the respective key buttons 139a to 139e of the respective horizontal key group 135a and the base plane 121 of the display unit 120 may gradually decrease proceeding along an outwardly direction from the display opening 111. That is, d1>d2>d3>d4>d5. In this embodiment, for example, the reference line 125a connecting and extending across the top end portions of the respective key buttons 139a to 139e in the respective horizontal key group 135a may be a straight line 125a. In an alternative embodiment, however, the reference line 125a may be a curved line 125b (FIG. 4B). Further, at least a portion of the reference line 125a may be parallel to the base plane 121. For example, d1>d2=d3>d4>d5.

Further, the distances between the top end portions of the respective key buttons 139a to 139e of the respective horizontal key group 135a and the base plane 121 of the display unit 120 may gradually increase and then gradually decrease proceeding along an outwardly direction from the display opening 111. That is, d1<d2<d3>d4>d5. In this embodiment, the reference line 125a connecting and extending across the top end portions of the respective key buttons 139a to 139e in the respective horizontal key group 135a may be an inverted line 125a. In an alternative embodiment, however, the reference line 125a may be a curved line 125b (FIG. 4B). Further, at least a portion of the reference line 125a may be parallel to the base plane 121. For example, d1<d2=d3>d4>d5.

Referring to FIG. 4B, the reference line 125b connecting and extending across the top end portions of the respective key buttons 139a to 139e in the respective horizontal key group 135a arranged in an outwardly direction from the display opening 111 may have a curvature radius of "R1". The curvature radius of "R1" may be determined in consideration of the size of the display unit 120, each width of left and right panel surfaces 114 and 115, the size and an interval of the key button 139, etc.

FIGS. 5A and 5B are sectional views of FIG. 3, taken along line 5-5. Referring to FIGS. 5A and 5B, at least a portion of a reference line 126a connecting and extending across the top end portions of each of the respective horizontal key groups 135a to 135d arranged along the edge side of the display opening 111 is angled with respect to the base plane 121 of the display unit 120.

Referring to FIG. 5A, distances between the top end portions of each of the horizontal key groups 135a to 135d and the base plane 121 are k1, k2, k3 and k4 proceeding along a direction from an upper portion to a lower portion of the front panel surface 113 of the portable computer 100 (FIG. 1), for example, along an edge side of the display opening 111, respectively. In an embodiment of the present general inventive concept, the top end portions of a respective horizontal key group 135a corresponds to the top end portions of any of the respective key buttons of the respective horizontal key group 135a, all of which have the same distance between the top end portion and the base plane 121, in the respective horizontal key group 135a. In another embodiment, the distance of the top end portions to the base plane 121 for each of the respective key buttons 139 in a respective horizontal key group 135a may vary. Accordingly, a respective key button 139 in each of the respective horizontal key groups 135 and 145 vertically arranged with respect to each other to form a column of respective key buttons. For example, referring to FIG. 3, the "T" key, "G" key, "B" key and "-" key are arranged vertically to form a column. Thus, in this embodiment, the column of respective key buttons may be used to illustrate the varying distances of the top end portions of key buttons to the base plane 121.

The distances between the top end portions of each of the respective horizontal key groups 135a to 135d and the base plane 121 of the display unit 120 may gradually increase proceeding along a direction from the upper portion to the lower portion of the front panel surface 113 of the portable computer 100 (FIG. 1), for example, along an edge side of the display opening 111. That is, k1<k2<k3<k4. In this embodiment, for example, a reference line 126a connecting and extending across the top end portions of each of the respective horizontal key groups 135a to 135d may be a straight line 126a. In an alternative embodiment, however, the reference line 126a may be a curved line 126b (FIG. 5B). Further, at least a portion of this reference line 126a may be parallel to the base plane 121. For example, k1<k2=k3<k4.

In another embodiment of the present general inventive concept, the distances between the top end portions of each of the respective horizontal key groups 135a to 135d and the base plane 121 of the display unit 120 may gradually decrease proceeding along the direction from the upper portion to the lower portion of the front panel surface 113 of the portable computer 100 (FIG. 1), for example, along the edge side of the display opening 111. That is, k1>k2>k3>k4. In this embodiment, for example, the reference line connecting and extending across the top end portions of each of the respective horizontal key groups 135a to 135d may be a straight line. In an alternative embodiment, however, the reference line may be a curved line. Further, at least a portion of the reference line may be parallel to the base plane 121. For example, k1>k2=k3>k4.

Further, the distances between the top end portions of each of the respective horizontal key groups 135a to 135d and the base plane 121 of the display unit 120 may gradually increase and then gradually decrease proceeding along the direction from the upper portion to the lower portion of the front panel surface 113 of the portable computer 100 (FIG. 1), for example, along the edge side of the display opening 111. That is, k1<k2>k3>k4. In this embodiment, the reference line 126a connecting and extending across the top end portions of each of the respective horizontal key groups 135a to 135d may be an inverted line 126a. In an alternative embodiment, however, the reference 126a line may be a curved line 126b (FIG. 5B). Further, at least a portion of the reference line 126a may be parallel to the base plane 121. For example, k1<k2=k3>k4.

Referring to FIG. 5B, the reference line 126b connecting and extending across the top end portions of each of the respective horizontal key groups 135a to 135d arranged along a direction from the upper portion to the lower portion of the front panel surface 113 of the portable computer 100 (FIG. 1), for example, along the edge side of the display opening 111 may have a curvature radius of "R2". The curvature radius of "R2" may be determined in consideration of the size of the display unit 120, each width of left and right panel surfaces 114 and 115, the size and the interval of the key button 139, etc.

In an embodiment of the present general inventive concept, the distances between the top end portions of each of the respective horizontal key groups 135a to 135d and the base plane 121 of the display unit 120 may gradually decrease and then gradually increase proceeding along a direction from the upper portion to the lower portion of the front panel surface 113 of the portable computer 100 (FIG. 1), for example, along the edge side of the display opening 111. That is, k1>k2<k3<k4. In this embodiment, the reference line 126b connecting and extending across the top end portions of the respective horizontal key groups 135a to 135d may be an inverted line. In an alternative embodiment, however, the reference line 126b may be a curved line 126b. Further, at least a portion of the reference line 126b may be parallel to the base plane 121. For example, k1<k2=k3>k4.

Likewise, the reference line 126b connecting and extending across the top end portions of each of the respective horizontal key groups 135a to 135d arranged in a direction from the upper portion to the lower portion of the front panel surface 113 of the portable computer 100 (FIG. 1), for example, along the edge side of the display opening 111 may have a curvature radius. The curvature radius may be determined in consideration of the size of the display unit 120, each width of left and right panel surfaces 114 and 115, the size and the interval of the key button 139, etc.

Accordingly, while a user inputs information such as text or the like with both hands while gripping the main body 110, an efficient path of manipulation with an input mechanism such as a thumb is secured. When left and right fingers move between the key buttons 139 of the key button input unit 130, interference by neighboring key buttons 139 to a user's manipulation of the key buttons 139 is minimized, thereby preventing a mistake caused by inadvertently pressing an incorrect key button 139. Thus, while pushing one of the key buttons 139, neighboring key buttons 139 are not inadvertently pressed. Further, this arrangement of the key buttons 139 enhances the appearance of the front panel surface 113.

Referring to FIG. 3, in an embodiment of the present general inventive concept, the character input keys 137 and 147 are disposed above or below the letter input keys 133 and 143, and include a plurality of key buttons 139. The character input keys 137 and 147, for example, are included in horizontal key groups 135 and 145 corresponding to each other and provided in the left panel surface 114 and the right panel surfaces 115. For example, the left character input keys 137 includes a "Shift" key, a "Num Lock" key, a "~" key, a "@" key, and a "-" key in an inwardly direction from an outside of the left panel surface 114 toward the display opening 111. The right character input keys 147 includes a "Space" key, an "Alt" key, a "?" key, and a "Shift" key in an outwardly direction from the display opening 111 toward an outside of the right panel surface 115. In addition, the right character input keys 147 may include a "←" key, an "Enter" key, etc. on the horizontal key group 145 also including one or more of the right letter input keys 143 in the right panel surface.

The character input keys 137 and 147 may be provided in both, or either, of the left panel surface 114 and the right panel surface 115, and may include a plurality of horizontal key groups. Further, the size of the character input keys 137 and 147 may vary according to a user's using frequency, disposed positions, etc.

Accordingly, a user can easily input information such as text or data like a keyboard while holding the left and right sides of the main body 110 in both hands.

Referring to FIG. 1, the additional input unit 150 is disposed in the left or right side of the front panel surface 113, and may include at least one of a camera unit 150a, an information reader 150b, and a microphone unit 150c.

The camera unit 150a may be disposed in a front center portion of the front panel surface 113, and photographs an object. Further, the camera unit 150a may include another camera disposed in the rear of the main body 110 as well as a camera in the front panel surface 113 so that it can photograph other objects such as a landscape. The position of the camera unit 150a may vary as necessary.

The information reader 150b may be disposed in a left side of the front panel surface 113, and reads a user's information. The information reader 150b may include a fingerprint reader to read a user's fingerprint, and/or other conventional devices to read the iris, the retina or the like of a user.

The microphone unit 150c allows a user to input a sound such as a voice. The microphone unit 150c may include a pair of microphones 150c1 and 150c2, which may be disposed in a lower portion of the front panel surface 113 and spaced apart from each other. The microphone unit 150c may include an array microphone. Thus, noise interfering with an input sound is minimized.

The function input unit 160 may be disposed in at least one of the left and right sides of the front panel surface 113, thereby allowing a user to selectively input various functions. The function input unit 160, for example, includes a Hall mouse 160a, a mouse function unit 160b, and a function-setting unit 160c. Further, the function input unit 160 may also include additional keys corresponding to various functions.

The Hall mouse 160a may be disposed in the left side of the front panel surface 113, and has a mouse function and an arrow-key function. The Hall mouse 160a includes, for example, a Hall moving member 160a1 disposed in the center thereof and provided to move an icon or a pointer on the display unit 120, and a Hall selector 160a2 shaped like a circle surrounding the Hall moving member 160a1 and provided to select a function of the Hall moving member 160a1. The Hall mouse 160a may be provided in the center of the left panel surface 114 so that a user's thumb can easily reach the Hall mouse 160a. Alternatively, the Hall mouse 160a may be placed in the right side of the front panel surface 113.

The mouse function unit 160b may be disposed in the right side of the front panel surface 113 and operates in cooperation with the selection of the mouse function in the Hall mouse 160a. The mouse function unit 160b includes a left mouse function key 160b2 and a right mouse function key 160b1.

The left mouse function key 160b2 clicks a function pointed to by a pointer or the like moved by the Hall mouse 160a.

The right mouse function key 160b1 performs a function to pop up a predetermined function at a position where the pointer is moved in cooperation with the Hall mouse 160a. For example, if the right mouse function key 160b1 is pushed in the state that the pointer is moved by the Hall mouse 160a, a block to select functions such as "copy," "paste," "paragraph" or the like is popped up, thereby allowing a user to select a predetermined function in the popped-up block.

Alternatively, the mouse function unit 160b may be disposed in the left side of the front panel surface 113.

The function-setting unit 160c may be disposed in the right side of the front panel surface 113, and allows a user to set the functions. The function-setting unit 160c includes an "Enter"

key 160c1 disposed in the center thereof, and a function setting member 160c2 shaped liked a circle around the "Enter" key 160c1 and allowing a user to select a desired function. According to an exemplary embodiment of the present general inventive concept, the function setting member 160c2 may set four functions, U1 through U4.

The function-setting unit 160c may be disposed in the center of the right panel surface 115 in consideration of the manipulation path of the thumbs of a user while the user grips the main body 110. Alternatively, the function-setting unit 160c may be disposed in the left side of the front panel surface 113.

In an embodiment of the present general inventive concept, the sizes of the Hall mouse 160a, the mouse function unit 160b, and the function-setting unit 160c may be determined in consideration of the size of the display unit 120, the sizes of the left and right panel surfaces 114 and 115, etc.

Accordingly, the function input unit 160 efficiently arranged on the front panel surface 113 allows a user to conveniently use the portable computer 100 while gripping the main body 110.

FIG. 6 is a control block diagram illustrating the portable computer 100 of FIG. 1, according to an exemplary embodiment of the present general inventive concept. Referring to FIG. 6, the controller 180 includes a central processing unit 181 to perform reading, operation, determination, etc. on the basis of input information, input data, etc.; and an output processing unit 183 to process the input information or the like processed by the central processing unit 181 to be output through the output unit 193.

The input unit 191 is provided in the main body 110 and transmits information to the controller 180 and/or a storage unit 187 of the main body 110 by various methods. According to an exemplary embodiment of the present general inventive concept, the input unit 191 includes the key button input unit 130, the additional input unit 150, and the function input unit 160. Alternatively, the input unit 191 may additionally include conventional input units as necessary.

The output unit 193 outputs the information or the like that is input through the input unit 191 and processed by the controller 180. According to an exemplary embodiment of the present general inventive concept, the output unit 193 includes the display unit 120, and the speaker unit 170. The main body 110 may be connected to an output apparatus such as a printer (not illustrated) or the like to thereby output the information. Additionally, the output unit 193 may include a small indicator (not illustrated) that informs a user of whether power is on or off as well as the display unit 120.

The storage unit 187 stores the information processed by the controller 180 or provided through the input unit 191. The information stored in the storage unit 187 may be used in the controller 180 as necessary.

The power supply unit 195 supplies power, for example, to the display unit 120, the speaker unit 170, and the controller 180 of the portable computer 100.

Meanwhile, other internal configurations of the portable computer 100 can be easily understood by persons skilled in the art, so that descriptions thereof will be omitted.

Operations of the portable computer 100 according to an exemplary embodiment of the present general inventive concept will be described with reference to FIGS. 1 through 6.

A user holds the main body 110 of the portable computer 100 in his/her left and right hands. Accordingly, a user's palms may be in contact with left and right bottoms of the front panel surface 113, and the back of the main body 110 may be held with, for example, the remaining fingers of the user's hands, excluding the thumbs. For example, the supporting brackets 119 may be held with eight fingers of both hands of the user, thereby allowing the user to stably grip the main body 110 of the portable computer 100.

The information input through the key input unit 130, the additional input unit 150 and the function input unit 160 undergoes the reading, the determination, the comparison, etc. of the central processing unit 181, and then is stored in the storage unit 187; displayed as an image on the display unit 120 via the output processing unit 183; or output as a sound through the speaker unit 170.

Accordingly, a user can use his/her left and right thumbs to input information such as letters and characters through the key button input unit 130 that is efficiently disposed in the portable computer 100. For example, the horizontal key groups 135 and 145 are disposed so that an angle between the horizontal key groups 135 and 145 and the base plane 121 can gradually decrease proceeding in a direction from the upper portion to the lower portion of the front panel surface 113 of the portable computer 100, thereby providing an efficient manipulation path of the thumbs. In an embodiment of the present general inventive concept, for example, interference of the manipulation path that a thumb would travel to make an input unit 191 selection is minimized, thereby providing convenience for a user to use the portable computer 100.

Further, the Hall mouse 160a may be of a relatively large size and disposed in the center of the left panel surface 114 of the front panel surface 113 in consideration of providing an efficient manipulation path of a user, thereby providing convenience for a user to use the portable computer 100.

As described above, in various embodiments of the present general inventive concept, the input unit and/or the output unit is efficiently disposed in the portable computer, thereby providing convenience with the usability and enhancing the outer appearance of the portable computer.

Further, in various embodiment of the present general inventive concept, interference of the manipulation path for a user to make an input selection is minimized, thereby reducing user fatigue due to use of the portable computer.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A portable information processing apparatus, comprising:
   a main body which comprises a display region, a left panel region and a right panel region;
   a display unit provided in the display region to display an image; and
   a key button input unit which comprises a plurality of horizontal key groups provided at the right panel region and at the left panel region each respective horizontal key group including a plurality of key buttons arranged in an outwardly direction from the display region,
   wherein the plurality of key buttons of each respective horizontal key group includes an innermost key button located nearest to the display region, an outermost key button located farthest from the display region and a plurality of intermediate key buttons disposed therebetween,
   wherein, with respect to each respective horizontal key group, a distance between a top edge of the innermost key button and a base plane of the display unit is less than a distance between a top edge of any one of the intermediate key buttons and the base plane of the display unit, and wherein, with respect to each respective horizontal key group, a distance between a top edge of the outermost key button and the base plane of the display unit is less than a distance between a top edge of any one of the intermediate key buttons and the base plane of the display unit.

2. The apparatus according to claim 1, wherein the key button input unit comprises at least one of a first key group and a second key group disposed in the left panel region and the right panel region, respectively, across the display region.

3. The apparatus according to claim 1, further comprising:
a reference line to connect and extend across top end portions of referenced key buttons in the plurality of horizontal key groups,
wherein distances between the top end portions of the referenced key buttons in the plurality of horizontal key groups and the base plane of the display unit gradually increase proceeding along the outwardly direction from the display region.

4. The apparatus according to claim 1, further comprising:
a reference line to connect and extend across top end portions of referenced key buttons in the plurality of horizontal key groups,
wherein distances between the top end portions of the referenced key buttons in the plurality of horizontal key groups and the base plane of the display unit gradually decrease proceeding along the outwardly direction from the display region.

5. The apparatus according to claim 1, further comprising:
a reference line to connect and extend across top end portions of referenced key buttons in the plurality of horizontal key groups.
wherein distances between the top end portions of the referenced key buttons in the plurality of horizontal key groups and the base plane of the display unit gradually increase and then gradually decrease proceeding along the outwardly direction from the display region.

6. The apparatus according to claim 5, wherein the reference line has a predetermined curvature.

7. The apparatus according to claim 1, further comprising:
a reference line to connect and extend across top end portions of referenced key buttons in the plurality of horizontal key groups,
wherein the at least a portion of the reference line forms the angle with respect to the base plane of the display unit in the direction along the edge side of the display region.

8. A portable information process apparatus, comprising:
a main body which comprises a display region, a left panel region and a right region;
a display unit provided in the display region to display an image; and
a key button input unit which comprises a plurality of horizontal key groups provided at the right panel region and at the left panel region, each respective horizontal key group including a plurality of key buttons arranged in an outwardly direction from the display region, the plurality of horizontal key groups being arranged in a direction along an edge side of the display region; and
a reference line to connect and extend across top end portions of referenced key buttons of the plurality of horizontal key groups arranged along the edge side of the display region;

wherein at least a portion of the reference line forms an angle with respect to a base plane including a viewing surface of the display unit, wherein the plurality of key buttons of each respective horizontal key group includes an innermost key button located nearest to the display region, an outermost key button located farthest from the display region and a plurality of intermediate key buttons disposed therebetween, wherein, with respect to each respective horizontal key group, a distance between a top edge of the innermost key button and the base plane of the display unit is less than a distance between a top edge of any one of the intermediate key buttons and the base plane of the display unit, and wherein, with respect to each respective horizontal key group, a distance between a top edge of the outermost key button and the base plane of the display unit is less than a distance between a top edge of any one of the intermediate key button and the base plane of the display unit.

9. The apparatus according to claim 8, wherein the key button input unit comprises at least one of a first key group and a second key group disposed in the left panel region and the right panel region, respectively, across the display region.

10. The apparatus according to claim 8, wherein distances between the top end portions of the referenced key buttons in the plurality of horizontal key groups and the base plane of the display unit gradually increase proceeding along an outwardly direction from the display region.

11. The apparatus according to claim 8, wherein distances between the top end portions of the referenced key buttons in the plurality of horizontal key groups and the base plane of the display unit gradually decrease proceeding along an outwardly direction from the display region.

12. The apparatus according to claim 8, wherein distances between the top end portions of the referenced key buttons in the plurality of horizontal key groups and the base plane of the display unit gradually decrease and then gradually increase proceeding along an outwardly direction from the display opening.

13. The apparatus according to claim 12, wherein the reference line has a predetermined curvature.

14. The apparatus according to claim 8, wherein distances between the top end portions of the referenced key buttons in the plurality of horizontal key groups and the base plane of the display unit gradually increase and decrease proceeding along an outwardly direction from the display opening.

15. The apparatus according to claim 14, wherein the reference line has a predetermined curvature.

16. The apparatus according to claim 8, wherein the at least a portion of the reference line forms the angle with respect to the base plane of the display unit in the direction along the edge side of the display region.

17. A portable information processing apparatus, comprising:
a front panel surface including a left panel region, a right panel, an upper portion and a lower portion; and
a display unit having a viewing surface to display an image, the display unit disposed proximate to the front panel surface;
wherein each of the left panel region having a first set of key buttons and the right panel region having a second set of key buttons form an angle with respect to a base plane including the viewing surface of the display unit,
wherein each of the first set of key buttons and the second set of key buttons respectively comprises a plurality of horizontal key groups sequentially arranged in a direction along an edge side of the display unit, wherein a plurality of key buttons of each respective horizontal key group includes an innermost key button located nearest to the display unit an outermost key button located farthest from the display unit and a plurality of intermediate key buttons disposed therebetween, wherein, with respect to each respective horizontal key group, a distance between a top edge of the innermost key button and the base plane of the display unit is less than a distance between a top edge of any one of the intermediate key buttons and the base plane of the display unit, wherein, with respect to each respective horizontal key group, a distance between a top edge of the outermost key button and the base plane of the display unit is less than a distance between a top edge of any one of the intermediate key buttons and the base plane of the display unit.

18. The apparatus according to claim 17, wherein, the angles are formed in a direction from the left panel region to the right panel region of the front panel surface.

19. The apparatus according to claim 17, wherein, the angles are formed in a direction from the upper portion to the lower portion of the front panel surface.

20. The apparatus according to claim 17, further comprising:

a display region disposed between the left panel regions, the right panel region, the upper portion and the lower portion of the front panel surface through which the image can be viewed.

21. A portable information processing apparatus, comprising:

a front panel surface including a left panel region, a right panel region, an upper portion and a lower portion;

a display unit having a viewing surface to display an image, the display unit being disposed proximate to the front panel surface and provided in a display region; and at least one set of key buttons disposed in the front panel surface, each of the at least one set of key buttons having top end portions arranged in at least a first direction such that a distance between two or more of the top end portions of each of the at least one set of key buttons arranged in at least the first direction and a base plane including the viewing surface of the display unit are not equal to each other, wherein each of the at least one set of key buttons respectively comprises a plurality of horizontal key groups, wherein the plurality of key buttons of each respective horizontal key group includes an innermost key button located nearest to the display region, an outermost key button located farthest from the display region and a plurality of intermediate key buttons disposed therebetween, wherein, with respect to each respective horizontal key group, a distance between a top edge of the innermost key button and the base plane of the display unit is less than a distance between a top edge of any one of the intermediate key buttons and the base plane of the display unit, and wherein, with respect to each respective horizontal key group, a distance between a top edge of the outermost key button and the base plane of the display unit is less than a distance between a top edge of any one of the intermediate key buttons and the base plane of the display unit.

22. The apparatus of claim 21, wherein the distances between all of the top end portions of each of the set of key buttons arranged in at least the first direction and the base plane including the viewing surface of the display unit are not equal to each other.

23. The apparatus according to claim 21, wherein the distances for each of the set of key buttons arranged in the first direction increase and decrease or decrease and increase proceeding along the first direction.

24. The apparatus according to claim 21, wherein the distances for each of the set of key buttons arranged in the first direction increase or decrease proceeding along the first direction.

25. The apparatus according to claim 21, wherein the first direction is a direction from the upper portion to the lower portion of the front panel surface.

26. The apparatus according to claim 21, wherein the first direction is a direction from the left panel region to the right panel region of the front panel surface.

27. A portable information processing apparatus, comprising:

a front panel surface including a left panel region, a right panel region, an upper portion and a lower portion;

a display unit having a viewing surface to display an image, the display unit being disposed proximate to the front panel surface and provided in a display region;

a first set of key buttons disposed in the left panel region, each of the first set of key buttons having top end portions arranged in at least a first direction; and a second set of key buttons disposed in the right panel region, each of the second set of key buttons having top end portions arranged in at least a second direction;

wherein a distance between two or more of the top end portions of each of the first set of key buttons arranged in at least the first direction and a base plane including the viewing surface of the display unit are not equal to each other, wherein each of the first set of key buttons and the second set of key buttons respectively comprises a plurality of horizontal key groups, wherein the plurality of key buttons of each respective horizontal key group includes an innermost key button located nearest to the display region, an outermost key button located farthest from the display region and a plurality of intermediate key buttons disposed therebetween, wherein, with respect to each respective horizontal key group, a distance between a top edge of the innermost key button and the base plane of the display unit is less than a distance between a tope edge of any one of the intermediate key buttons and the base plane of the display unit, and wherein, with respect to each respective horizontal key group, a distance between a top edge of the outermost key button and the base plane of the display unit is less than a distance between a top edge of any one of the intermediate key buttons and the base plane of the display unit.

28. The apparatus according to claim 27, wherein a distance between two or more of the top end portions of each of the second set of key buttons arranged in at least the second direction and the base plane including the viewing surface of the display unit are not equal to each other.

29. The apparatus according to claim 21, wherein both the first direction and the second direction are a direction from the upper portion to the lower portion of the front panel surface.

30. The apparatus according to claim 21, wherein the first direction is a direction from the left panel region to the right panel region of the front panel surface, and the second direction is a direction from the right panel region to the left panel region of the front panel surface.

31. A portable information processing apparatus, comprising:
- a main body which comprises a display region, a left panel region and a right panel region;
- a display unit provided in the display region to display an image; and
- a key button input unit which comprises a plurality of horizontal key groups provided at the right panel region and at the left panel region, each respective horizontal key group including a plurality of key buttons arranged in an outwardly direction from the display region,
- wherein the plurality of key buttons of each respective horizontal key group includes an innermost key button located nearest to the display region, an outermost key button located farthest from the display region and a plurality of intermediate key buttons disposed therebetween,
- wherein, with respect to each respective horizontal key group, a distance between a top edge of the innermost key button and a base plane of the display unit is less than a distance between a top edge of any one of the intermediate key buttons and the base plane of the display unit, and
- wherein, with respect to each respective horizontal key group, a distance between a top edge of the outermost key button and the base plane of the display unit is greater than a distance between a top edge of any one of the intermediate key buttons and the base plane of the display unit.

* * * * *